United States Patent Office 3,441,466
Patented Apr. 29, 1969

3,441,466
GLASS FIBER REINFORCED POLYSTYRENE ARTICLE AND PROCESS THEREFOR
Samuel Sterman, Williamsville, and James G. Marsden, Tonawanda, N.Y., assignors to Union Carbide Corporation, a corporation of New York
No Drawing. Filed Feb. 1, 1966, Ser. No. 523,879
Int. Cl. B29c *17/04;* B32b *17/04*
U.S. Cl. 161—93       6 Claims This invention is directed to glass-reinforced polystyrene.

Polystyrene resin is a thermoplastic material of construction which is used in a large number of applications such as toys, housewares, toilet articles, packaging, name plates, refrigerator parts, wall tile, and many others. However, normally polystyrene has low strength, poor heat resistance, and it crazes readily. Such shortcomings can be mitigated to a certain extent by the incorporation within the polystyrene resin of strengthening materials such as glass in fibrous form.

It has now been found that further improvement in the physical properties of polystyrene can be achieved by treating styrene resin, with certain chemical compounds. Accordingly, it is the principal object of this invention to provide as a material of construction polystyrene reinforced by fibrous glass and exhibiting materially enhanced physical properties while retaining its thermoplastic properties.

A further object of this invention is to provide a method for enhancing the physical properties of glass-reinforced polystyrene resin.

Still other objects will become obvious to one skilled in the art upon reference to the ensuing specification and the claims.

The objects of this invention are achieved by an article of manufacture which is a thermoplastic composite of fibrous glass, polystyrene, and an organofunctional alkyltrialkoxysilane which can be an (epoxycycloalkyl)alkyltrialkoxysilane or an (acryloxy)alkyltrialkoxysilane.

The above article of manufacture possessing the enhanced physical properties can be prepared by (1) providing a fibrous glass substrate, (2) by treating this substrate with the aforementioned organofunctional alkyltrialkoxysilane, (3) then intimately contacting the treated glass substrate with the polystyrene resin, and (4) thermoforming the resulting composite at a temperature below the decomposition temperature of the resin and the silane.

Polystyrene is a thermoplastic resin derived from homopolymerization of styrene. The resin is substantially fully polymerized, is chemically inert, and contains no apparent reaction sites. The resin may be thermoformed over and over again without undergoing further cure or hardening. Any residual unsaturation remaining in polystyrene after the polymerization is purely incidental and does not affect the thermoplastic nature of the resin.

The crux of the present invention is the selection of the proper organofunctional silane for the treatment of the fibrous glass employed for reinforcement. This selection must be carried out with great care since an improper choice will work to the detriment of the physical properties of the ultimate article. Furthermore, considerable research into the reaction mechanisms involved has failed to cast light on the observed phenomena and the prediction of the performance of a particular organofunctional silane in the selected resin system, even on the basis of observed performance of silanes having closely related organofunctional groups, is virtually impossible.

Two groups of organofunctional silanes have been found to materially enhance the physical properties of polystyrene resin reinforced with fibrous glass: the (epoxycycloalkyl)alkyltrialkoxysilanes and the (acryloxy)alkyltrialkoxysilanes.

Illustrative of the former group are beta-(3,4-epoxycyclohexyl)ethyltrimethoxysilane, beta-(3,4-epoxycyclohexyl)propyltriethoxysilane, beta-(4,5-epoxycycloheptyl) ethyltrimethoxy silane, beta-(2,3-epoxycyclohexyl)butyltripropoxysilane, and the like. In this connection it should be noted that the use of gamma-(glycidoxypropyl)trimethoxysilane fails to give the desired enhancement in the physical properties.

Illustrative of the latter of the aforementioned organofunctional silanes that are suitable for the practice of the present invention are gamma-(methacryloxy)propyltrimethoxysilane, beta-(acryloxy)ethyltriethoxysilane, delta (methacryloxy)butyltrimethoxysilane, gamma-(acryloxy) propyltributoxysilane, and the like.

In order to be suitable for the purposes of the present invention the glass must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized, with the organofunctional silane in any convenient manner. The silane can be applied to the glass fibers at the extrusion bushing as the fibers are produced or the sizing can be carried out by means of an aqueous solution of the proper silane into which the glass fibers are dipped and subsequently dried. In the latter instance the corresponding hydrolyzate is deposited on the substrates.

It will be apparent to one skilled in the art that the materials actually deposited on glass fabric from aqueous silane solution in the examples appearing below are hydrolyzates rather than the silanes as such. These hydrolyzates are siloxanes e.g., epoxycycloalkylsiloxane (such as beta-(3,4-epoxycyclohexyl)ethylsiloxane) and acyloxyalkylsiloxanes (such as gamma-glycidoxypropylsiloxanes). During hydrolysis, the epoxy rings of the epoxycycloalkylsilanes may open to produce hydroxycycloalkylsiloxanes.

The loading of the silane on the glass fibers must be sufficient to enhance the flexural strength of the ultimate thermoformed article. While for practical applications the loading is usually expressed in terms of weight percent, based on the weight of the treated glass fibers, it must be noted that the minimum loading requirement may vary depending on the surface area of the particular glass fibers that are employed. When fibrous glass having a surface area of from about 0.1 to about 0.2 square meter per gram is employed effective silane loading can range from about 0.01 to about 5 weight percent, based on the weight of the treated fiber. Preferably the silane loading is in the range from about 0.1 to about 0.75 weight percent.

The silane-treated fibrous glass and the polystyrene resin are brought in intimate contact with each other in any convenient manner and then thermoformed. The term "thermoforming" as used herein and in the appended claims is taken to mean the transformation of the resin-silane-glass composite into useful shapes by means of heat and/or pressure. Illustrative thermoforming processes are molding, extrusion, hot calendering, casting, vacuum forming, and the like.

Several methods of achieving intimate contact between the treated fibrous glass and the polystyrene resin are illustrated by the examples below. Still other methods include the utilization of polystyrene film or sheet and the preparation of a dry laminate having alternating plies of fibrous glass and polystyrene which is then molded, the admixture of chopped silane-treated glass fibers with warm or hot, fluid polystyrene resin in a mechanical mixer prior to extrusion, the treating of continuous, silane-treated roving with a solution of the polystyrene resin in a suitable solvent, the calendering of the polystyrene resin onto a treated glass cloth or mat, and the like.

The following examples further illustrate the present invention.

EXAMPLE I

This example compares the effect on the flexural strength of a glass reinforced polystyrene composite using woven glass reinforcement (a satin weave cloth having a thickness of 10 mils, weighing about 8.9 ounces per square yard, having 57 x 54 ends and picks per square inch and a breaking strength of 375 x 350 pounds per square inch; the weaving size having been burned off in a heat cleaning operation) without a silane treatment and woven glass reinforcement treated with gamma-methacryloxy-propyltrimethoxysilane. The silane was applied to the glass in the following manner:

An aqueous treating bath containing about one weight percent gamma-methacryloxypropyltrimethoxysilane was prepared by adding the silane to water adjusted to pH 3.5–5 with acetic acid and gently stirring until the silane hydrolyzed resulting in a clear colorless solution. Ten inch wide strips of the woven glass fabric were passed through the treated solution, dried at room temperature, and then placed in an oven for two and one-half minutes at 135° C. The glass fabric picked up about one-half of its weight of the treating solution, and after evaporation of the solvent there remained a coating on the glass fabric equivalent to about 0.5 weight percent of the silane, based on the weight of the fabric.

The silane treated glass fabric was then impregnated with polystyrene resin by passing the silane treated glass fabric through a 25 wt.-percent solution of polystyrene resin in toluene, allowing most of the toluene to evaporate at room temperature, and then driving off the last traces of solvent by heating the treated fabric at 135° C. for 1½ hours. The treated fabric at this point contained about 75 wt.-percent resin based on the weight of the glass fabric.

The polystyrene-impregnated, silane treated glass fabric was then cut into 10″ x 10″ squares and 11 plies of this material placed in a press preheated to about 177° C. and pressed to 0.125 inch stops. This composite was molded for 20 minutes under these conditions, the press cooled, and the composite removed. A composite approximately 0.125 inch thick and having a resin content of about 40±2 wt.-percent was obtained.

A second composite was prepared by the same procedure except untreated woven glass fabric was used as the reinforecment instead of the silane treated glass fabric.

Flexural strength test specimens of approximately 4″ x ½″ x ⅛″ were cut from both composites and the flexural strength determined according to ASTM method D-7990-61. Specimens from each composite were divided into three groups. Group 1 was tested at room temperature, Group 2 at room temperature after the spicemens had been immersed in water at 50° C. for 16 hours and Group 3 was tested at 93° C. The flexural strengths are given in Table I below.

EXAMPLE II

Another silane treated glass reinforced polystyrene composite was prepared as described in Example I except beta(3,4-epoxycyclohexyl)ethyltrimethoxysilane was used to treat the glass fabric. Due to the solubility characteristics of this silane it was applied to the glass fabric from a 75–25 water ethanol solution. The flexural strengths of this composite under the same conditions as recited in Example I are reported in Table I, below.

EXAMPLE III

Another silane treated glass reinforced polystyrene composite was prepared as described in Example I except gamma-glycidoxypropyltrimethoxysilane was used to treat the glass fabric. The flexural strengths of this composite under the indicated conditions are given in Table I, below.

EXAMPLE IV

Another silane treated glass reinforced polystyrene composite was prepared as described in Example I except vinyltris(beta-methoxy-ethoxy)silane was used to treat the glass fabric. The flexural strengths of this composite under the indicated conditions are given in Table I, below.

TABLE I

| Silane Composition | Wt. percent | Flexural Strength p.s.i. $\times 10^{-3}$ | | |
|---|---|---|---|---|
| | | Dry | Wet | 200° F. (93° C.) |
| Control (no silane) | | 24.4 | 15.8 | 16.8 |
| Gamma-(methacryloxy)propyl-trimethoxysilane | 0.5 | 48.4 | 31.0 | 28.9 |
| Beta-(3,4-epoxycyclohexyl)-ethyltrimethoxysilane | 0.5 | 42.8 | 33.5 | 26.3 |
| Vinyl-tris(beta-methoxy-ethoxy)silane | 0.5 | 28.6 | 20.4 | 9.2 |
| Gamma-glycidoxypropyl-trimethoxysilane | 0.5 | 27.5 | 22.5 | 15. |

From the data in the foregoing Table it is readily apparent that a substantial enhancement of the flexural strength was achieved using an (alcryloxy)alkyltrialkoxysilane or an (epoxycyclocloalkyl)alkltriolkoxysilane whereas in contradistinction thereto silanes with similar organofunctional groups (c.f.: vinyl vs. acryloxy, glycidoxy vs. epoxycyloalkyl) failed to achieve a material increase in flexural strength.

EXAMPLE V

A laminate prepared in accordance with the method set forth in Example II was evaluated for its electrical properties. The results are reported in Table II below.

TABLE II

| | Dielectric constant, 1,000 cycles/sec. | | Dissipation factor, 1,000 cycles/sec. | | Volume resistivity, ohm/cm. | | Dielectric strength, volts/mil. | |
|---|---|---|---|---|---|---|---|---|
| | Dry | Wet[1] | Dry | Wet[1] | Dry | Wet[1] | Dry | Wet[1] |
| Polystyrene+untreated glass | 3.5 | 13.0 | 0.070 | 0.850 | $10^{11}$ | ([2]) | 215 | 16 |
| Polystyrene+treated glass | 3.7 | 3.8 | 0.002 | 0.008 | $10^{12}$ | $10^{12}$ | 216 | 216 |

[1] The laminates were immersed for about 16 hours in water at about 50° C. and tested at room temperature.
[2] Very low.

The above data indicate that the polystyrene laminates with glass cloth treated with beta-(3,4-epoxycyclohexyl) ethyltrimethoxysilane possess remarkably superior electrical properties inasmuch as such properties are not affected by an extended soaking of the laminate in water.

We claim:
1. A method for reinforcing substantially fully polymerized thermoplastic polystyrene resin which comprises (1) providing a fibrous glass substrate, (2) treating the glass substrate with an organofunctional alkyltrialkoxysilane which is a member of the group consisting of (epoxycycloalkyl)alkyltrialkoxysilane and (acryloxy)alkytrialkoxysilane so as to deposit thereon said silane or a hydrolzate thereof, (3) intimately contracting the treated glass substrate with the polystyrene resin, and (4) thermoforming the resulting composite at a temperature below the decomposition temperature of the resin and the silane; the amount of silane deposited on the glass fiber being sufficient to enhance the flextural strength of the thermoformed composite.

2. The method in accordance with claim 1 wherein the organofunctional alkyltrialkoxysilane is beta-(3,4-epoxycyclohexyl)ethyltrimethoxysilane or the corresponding hydrozate thereof.

3. The method in accordance with claim 1 wherein the organofunctional alkyltrialoxysilane is gamma-methacryloxy-propyltrimethoxysilane or the corresponding hydrolylyzate thereof.

4. An article of manufacture which is a thermoplastic composite of fibrous glass, polystyrene, and an organofunctional alkyltrialkoxysilane selected from the group consisting of (epoxycycloalkyl)alkyltrialkoxysilane and (acryloxy)alkyltrialkoxysilane or a corresponding hydrolyzate thereof.

5. An article of manufacture in accordance with claim 4 wherein the organofunctional alkyltrialkoxysilane is beta-(3,4-epoxcylohexyl)ethyltrimethoxysilane or the corresponding hydrolyzate thereof.

6. An article of manufacture in accordance with claim 4 wherein the organofunctional alkyltrialkoxysilane is gamma-methacryloxypropyltrimethoxysilane or the corresponding hydrolyzate thereof.

References Cited

UNITED STATES PATENTS 3,306,800   2/1967   Plueddemann _____ 161—193

ROBERT F. BURNETT, *Primary Examiner.*

W. J. VAN BALEN, *Assistant Examiner.*

U.S. Cl. X.R.

161—193; 117—76, 126; 264—90, 175